(12) United States Patent
Gaither

(10) Patent No.: US 9,863,403 B2
(45) Date of Patent: Jan. 9, 2018

(54) WIND TURBINE SYSTEMS AND AIR CHANNELS IN VEHICLES FOR ENHANCING ENERGY GENERATION, COOLING, AND AERODYNAMICS

(71) Applicant: Toyota Motor Engineering & Manufacturing North America, Inc., Erlanger, KY (US)

(72) Inventor: Geoffrey Gaither, Torrance, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 96 days.

(21) Appl. No.: 14/863,277

(22) Filed: Sep. 23, 2015

(65) Prior Publication Data
US 2017/0082092 A1    Mar. 23, 2017

(51) Int. Cl.
*B60K 11/06*    (2006.01)
*F03D 9/32*    (2016.01)
(Continued)

(52) U.S. Cl.
CPC ............. *F03D 9/32* (2016.05); *B60K 11/06* (2013.01); *B60K 11/085* (2013.01); *B60K 16/00* (2013.01);
(Continued)

(58) Field of Classification Search
None
See application file for complete search history.

(56) References Cited

U.S. PATENT DOCUMENTS 3,876,925 A    4/1975    Stoeckert
4,314,460 A    2/1982    Boodman et al.
(Continued)

FOREIGN PATENT DOCUMENTS

WO    WO 2012041321 A1 *    4/2012    ............ F16D 61/00
WO    WO 2013/041907    3/2013

OTHER PUBLICATIONS

John McCosker; Design and Optimization of a Small Wind Turbine; Dec. 2012; 56 pages.
(Continued)

*Primary Examiner* — James A Shriver, II
*Assistant Examiner* — Hilary L Johns
(74) *Attorney, Agent, or Firm* — Snell & Wilmer L.L.P.

(57) ABSTRACT

Air channels and wind turbines systems are provided for cooling vehicle parts and storing electrical energy in a vehicle battery. The vehicle may have a battery, a braking system, an air duct with wind turbines and a generator. The air duct has an inlet portion for receiving an airflow, a body portion having wind turbines, and an outlet portion for directing the airflow to the braking system. A generator converts kinetic energy of the wind turbines to electrical energy stored in the battery. The wind turbines can be positioned in an air duct extending from a front bumper to an area proximal to one or more wheels to enhance vehicle aerodynamics. Alternatively, the wind turbines can be positioned in openings between grill shutters to generate energy and cool a radiator. Alternatively, the wind turbines can be positioned proximal to powertrain or drivetrain components for cooling and generating electrical energy.

22 Claims, 7 Drawing Sheets

(51) Int. Cl.
*F03D 9/00* (2016.01)
*F03D 9/11* (2016.01)
*B60T 5/00* (2006.01)
*B60R 19/48* (2006.01)
*B60K 11/08* (2006.01)
*B60K 16/00* (2006.01)
*B62D 35/00* (2006.01)
*B60L 8/00* (2006.01)
*F03D 9/25* (2016.01)
*F16D 65/847* (2006.01)

(52) U.S. Cl.
CPC .............. *B60L 8/006* (2013.01); *B60R 19/48* (2013.01); *B60T 5/00* (2013.01); *B62D 35/00* (2013.01); *F03D 9/002* (2013.01); *F03D 9/11* (2016.05); *F03D 9/25* (2016.05); *F16D 65/847* (2013.01); *B60K 2016/006* (2013.01); *B60R 2019/486* (2013.01)

(56) References Cited

U.S. PATENT DOCUMENTS

| | | | |
|---|---|---|---|
| 6,838,782 B2 | 1/2005 | Vu | |
| 7,147,069 B2 | 12/2006 | Maberry et al. | |
| 7,713,103 B2* | 5/2010 | Burgoyne | B60F 3/0053 440/88 C |
| 7,808,121 B1 | 10/2010 | Glynn et al. | |
| 8,063,503 B2 | 11/2011 | Bahari | |
| 8,253,262 B1 | 8/2012 | Kiler | |
| 9,022,150 B2 | 5/2015 | Cunico | |
| 2003/0057708 A1* | 3/2003 | Wu | F03D 13/20 290/55 |
| 2007/0163829 A1 | 7/2007 | Ellis | |
| 2010/0052605 A1 | 3/2010 | Prestridge et al. | |
| 2011/0031043 A1 | 2/2011 | Armani | |
| 2011/0155675 A1* | 6/2011 | Yamaguchi | H05K 7/20736 211/26 |
| 2011/0198135 A1 | 8/2011 | Kalinina et al. | |
| 2012/0125700 A1 | 5/2012 | Bailey, Sr. et al. | |
| 2012/0286513 A1 | 11/2012 | Marano | |
| 2015/0094926 A1* | 4/2015 | O'Meachair | B60T 5/00 701/70 |
| 2016/0121859 A1* | 5/2016 | Weber | F16D 65/847 188/264 A |

OTHER PUBLICATIONS

Website: http://www.ewp.rpi.edu/hartford/~ernesto/SPR/McCosker-FinalReport.pdf ; Air Ducting for Short Track Stock Car Racing; Apr. 2002; 4 pages.
Website: http://www.quora.com/What-is-the-purpose-of-grille-slats-on-cars; Accessed Sep. 21, 2015; 2 Pages.
Website: https://en.wikipedia.org/wiki/Axial_fan_design; Accessed Sep. 21, 2015; 10 pages.
Website: https://en.wikipedia.org/wiki/Gas_compressor; Accessed Sep. 21, 2015; 10 pages.
Website: http://www.motorauthority.com/news/1099162_mustang-tech-makes-ford-f-150-slipperier-than-ever; Accessed Sep. 21, 2015; 4 pages.

* cited by examiner

WIND TURBINE SYSTEMS AND AIR CHANNELS IN VEHICLES FOR ENHANCING ENERGY GENERATION, COOLING, AND AERODYNAMICS

BACKGROUND

Field

The present disclosure relates to wind turbine systems and air channels in vehicles for enhancing energy generation, cooling and/or aerodynamics of the vehicle.

Description of the Related Art

With increasing global energy prices and growing environmental concerns regarding fuel emissions, vehicle manufacturers have sought to harness and regenerate various forms of renewable energy. For example, hybrid or electric vehicles can convert the kinetic energy during deceleration of the vehicle to electrical energy stored in a battery. The stored electrical energy can be utilized to propel movement of the vehicle and/or power an operation of an auxiliary device such as the HVAC (Heating, Ventilating and Air Conditioning) system. Vehicle manufacturers have also attempted to harness solar energy using solar panels.

There is a need in the art for effectively harnessing wind energy in air channels of vehicles and storing the energy in a battery for powering an operation of the vehicle. Certain conventional vehicles utilize air channels, for example, for enhancing aerodynamics of the vehicle. Conventional vehicles further utilize inlet airflows when the vehicle is travelling at a relatively high speed for cooling vehicle parts (such as a radiator that is vulnerable to over-heating during a prolonged engine operation).

There is a need in the art for a system that can effectively harness wind energy while advantageously contributing to cooling of vehicle parts and/or enhancing the aerodynamics of the vehicle.

SUMMARY

The present invention relates to air channels and a wind turbine system that effectively harness wind energy while advantageously enhancing cooling of vehicle parts and/or the aerodynamics of the vehicle. The system advantageously increases an amount of electrical energy stored in a battery of the vehicle by harnessing wind energy. As a result, an advantage of the present invention is that the energy cost of using the vehicle is significantly decreased because the vehicle would require less re-fueling and/or less battery re-charging of the battery using an external power source.

The system of the present invention advantageously enhances cooling of vehicle parts that benefit from cooling (such as a breaking system or a radiator), for example, by effectively re-directing the inlet airflow to such parts. Moreover, the wind turbines can be selectively powered to increase their respective rotational force to advantageously improve or speed up cooling. Yet another advantage of the air channels and wind turbines is that they significantly improve aerodynamics of the vehicle (for example, by reducing drag components).

According to an aspect of the invention, the vehicle may include a battery, a braking system, an air duct with at least one wind turbine and a generator. The braking system may have a rotor and a brake pad for decelerating rotation of wheels of the vehicle. The air duct may be positioned at one or two sides of the vehicle for cooling the braking system. The air duct has an inlet portion forming an opening with a first cross-sectional for receiving an inlet airflow. The air duct further has an outlet portion with a second cross-sectional area positioned proximal to at least a portion of the braking system. The outlet portion directs an outlet airflow to the braking system. The air duct has a body portion between the inlet and outlet portions. At least one wind turbine is positioned at a third cross-sectional area of the body portion. The third cross-sectional area is smaller than the first cross-sectional area and larger than the second cross-sectional area, for increasing an exit velocity of the outlet airflow. The outlet airflow advantageously enhances cooling of the braking system. The at least one wind turbine has blades configured to be rotated by the inlet airflow. A motor or generator converts kinetic energy from the rotation of the blades to electrical energy stored in the battery. The electrical energy can be advantageously used to power an operation of the vehicle.

According to another aspect of the invention, the wind turbines can be positioned in an air duct extending from a front bumper to an area proximal to the wheels. The outlet portion may be positioned proximal to at least one of the wheels for outputting an outlet airflow around and away from the wheels. The outlet airflow advantageously reduces an aerodynamic drag force on the vehicle.

According to another aspect of the invention, the wind turbines can be positioned in openings formed between shutters of a grill. The vehicle may further include an electronic control unit (ECU) connected to at least one positioning motor for controlling rotation or tilting of the first shutter, the second shutter, and/or the at least one wind turbine. An advantage of controlling the rotation or tilting is that generation of electrical energy and cooling of the radiator can be enhanced.

According to another aspect of the invention, the wind turbines can be positioned in an air channel between an underbody panel of a vehicle and one or more powertrain/drivetrain devices. At least one wind turbine can be positioned proximal to an opening of the underbody panel for advantageously generating electrical energy using an inlet airflow of the air channel. Alternatively or in addition, at least another wind turbine can be positioned at a rear exit portion of the air channel for further generating electrical energy using an outlet airflow of the air channel. The air channel advantageously cools the powertrain/drivetrain devices. Furthermore, the wind turbines can advantageously generate a significant amount of electrical energy that can be used for powering an operation of the vehicle.

Therefore, the system of the present invention provides an effective solution for harnessing wind energy while advantageously contributing to cooling of vehicle parts and/or enhancing the aerodynamics of the vehicle.

BRIEF DESCRIPTION OF THE DRAWINGS

Other systems, features, and advantages of the present invention will be apparent to one skilled in the art upon examination of the following drawings and description. Drawings are not necessarily to scale, and may be exaggerated to better illustrate features of the present invention. The first digit of each reference numeral generally indicates the drawing in which the element appears. The right-most two digits that are common in different drawings relate to elements having certain similar characteristics.

DETAILED DESCRIPTION

The present invention relates to air channels and a wind turbine system in vehicles for effectively harnessing wind energy, while advantageously contributing to cooling of vehicle parts and/or enhancing aerodynamics of the vehicle. The vehicle may include a braking system and an air duct with at least one wind turbine. The vehicle may further include a generator for converting the kinetic energy of the wind turbine to electrical energy stored in a battery. As a result, an advantage of the present invention is that the energy cost of using the vehicle is significantly decreased because the vehicle would require less re-fueling and/or less re-charging of the battery using an external power source. Furthermore, the air channel and the wind turbine system can be designed and controlled to effectively enhance cooling of the braking system.

According to another aspect of the invention, the wind turbines can be positioned in an air duct extending from a front bumper to an area proximal to one or more of the vehicle's wheels. The air channels and the wind turbines can be advantageously designed to significantly improve vehicle aerodynamics by reducing aerodynamic drag components.

Yet another unique advantage of the invention is that the wind turbines can be positioned in openings formed between shutters of a grill to generate energy and enhance cooling of vehicle parts that are vulnerable to over-heating such as a radiator. The wind turbines can be controlled by an electronic control unit (ECU) to effectively re-direct the airflow to cool such vehicle parts.

Alternatively or in addition, the wind turbines can be positioned proximal to an engine oil reservoir and/or powertrain or drivetrain devices for generating energy and cooling the reservoir and/or devices. A significant amount of electrical energy can be generated using the inlet airflow, thereby advantageously improving fuel economy and reducing energy cost.

Figure 1:
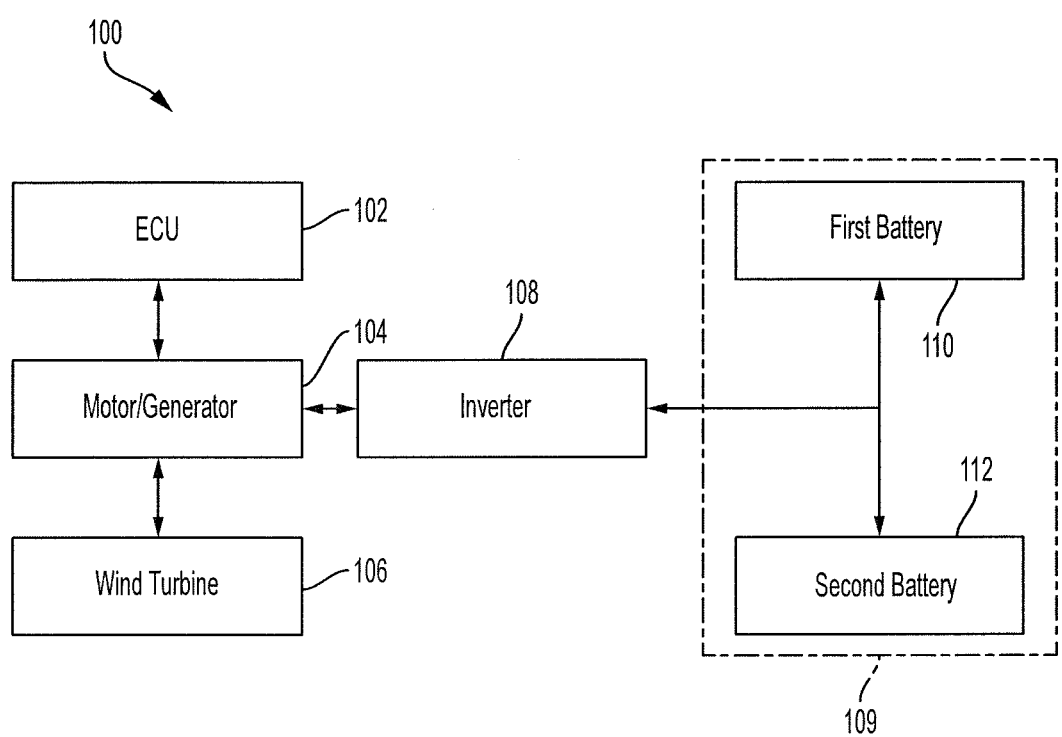
FIG. 1 is a block diagram of certain components of a vehicle for generating electrical energy using wind turbines, according to an aspect of the present invention.

The discussion now turns to interaction of certain elements of a vehicle 100, as shown in the block diagram of FIG. 1, utilized for harnessing wind energy. The vehicle 100 includes one or more wind turbines 106 that are positioned in air channels or ducts to harness wind energy. The motor/generator 104 converts the kinetic energy from rotation of the wind turbine 106 into electrical energy. The motor/generator 104 may include a generator and/or a dual purpose motor-generator (M-G) that can operate in a motor mode or a generator mode. The generator or the M-G is connected, for example, via a rotating shaft, planetary gears and/or various other rotating connection links to the wind turbine 106. The generator or the M-G may be positioned proximal to the wind turbine or may alternatively be positioned in a more remote part of the vehicle 100.

The generator or the M-G may output AC voltage/current. An inverter 108 can be utilized to convert the output to DC voltage/current that can be stored as electrical energy in the first battery 110 and/or the second battery 112. The stored electrical energy can be utilized to propel wholly or in part a movement of the vehicle 100 or power an auxiliary device of the vehicle 100. Accordingly, the present invention advantageously allows wind energy to be harnessed and re-used for powering various types of vehicle operations. Furthermore, the wind turbines and the air channels are designed such that the cooling operations and/or the vehicle aerodynamics are enhanced, as discussed in further details below with respect to FIGS. 2-10.

The system of the invention can be implemented in a hybrid vehicle, a conventional engine-operated vehicle, an electric vehicle, a plug-in hybrid vehicle, or other vehicles. The one or more batteries 109 stores the electrical energy generated by the wind turbine 106 and may include a first battery 110 and/or a second battery 112. The first battery 110 may be the primary one or more batteries of a hybrid or electric vehicle 100. The second battery 112 may be one or more separate batteries utilized for storing energy generated by the wind turbine 106. Both the first and second batteries 110 and 112 may be used for storing the generated energy. If one of the batteries reaches a full state of charge, the overflow energy can be directed to be stored in the other battery that is capable of being charged. Alternatively, only the first battery 110 or only the second battery 112 can be utilized for storing energy generated by the wind turbine 106.

As explained further below, it may be desirable at times to enhance cooling of a vehicle device or part by activating or increasing rotation of the wind turbine 106. The motor or the generator 104 may include an M-G having the capability of actively rotating the wind turbine 106 to enhance cooling. Alternatively, a motor separate from the generator can be utilized. That is, the motor can separately propel rotation of the wind turbine 106 when needed, and the generator can separately generate electrical energy when the wind turbine 106 is rotated using wind energy.

The electronic control unit (ECU) 102 determines when to power the rotation of the wind turbine 106 based on certain parameters detected by sensors (such as the speed of the vehicle and/or the temperature of the part/device desired to be cooled). The ECU 102 can further determine the amount of battery power used for rotating the wind turbine 106 based on the detected parameters.

The ECU 102 may be the engine control unit of the vehicle 100. The ECU 102 may alternatively be a separate electronic control unit having one or more processors directed to managing primarily or solely the operation of the at least one wind turbine 106. The one or more processors can be integrated circuits used for controlling vehicle operations, such as operations of the motor or the generator 104. The ECU 102 may be connected to a memory that includes codes or instructions (such as look-up tables) for operations of the ECU 102 based on the detected parameters. Alternatively, more than one electronic control unit may operate in conjunction with one another to manage operation of the motor or the generator 104.

Figure 2:
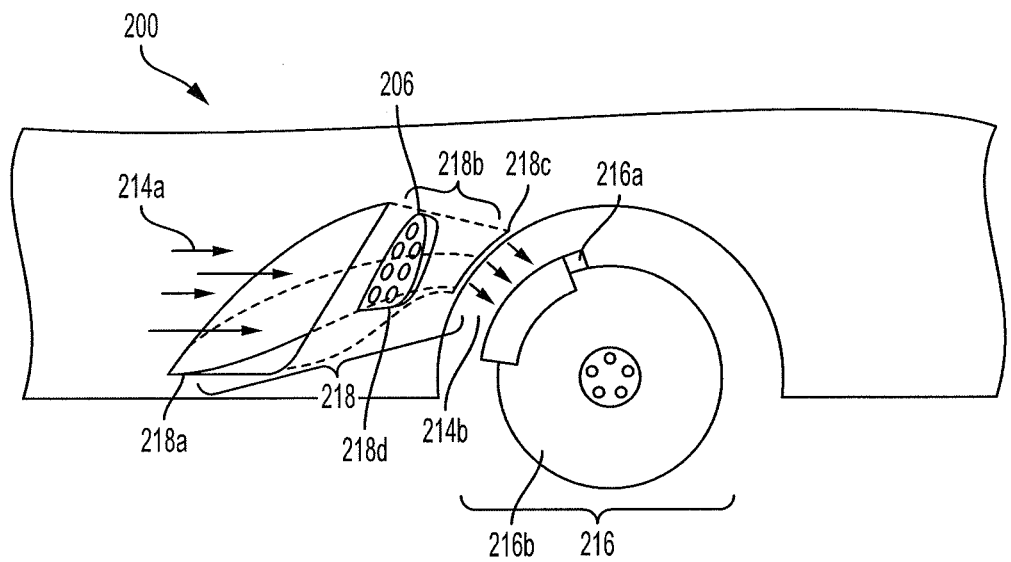
FIG. 2 is a schematic side view of an air duct with a wind turbine system in a vehicle for generating electrical energy and cooling a braking system, according to an aspect of the present invention.

The discussion now turns to certain exemplary embodiments in which air channels and a wind turbine system are configured to generate electrical energy and enhance cooling of vehicle parts. FIG. 2 is a schematic side view of a vehicle 200 for cooling a braking system 216 and generating electrical energy using the wind turbines 206. The braking system 216 may include any braking device that would benefit from cooling (e.g., a friction braking system with brake pads and rotors). Although only certain parts of the braking system 216 are shown in FIG. 2 (such as the brake caliper 216a and the rotor 216b), it can be appreciated that the braking system 216 may include other parts that are cooled such as brake pads.

One or both sides of the vehicle 200 includes an air duct 218 having an inlet portion 218a with an opening for receiving an inlet airflow 214a. As explained below in further details with respect to FIG. 5, the position and/or the shape of the air duct 218 can be optimized to enhance cooling and electrical generation. The opening has a first cross-sectional area, which may have a substantially triangular shape as shown. One or more sides of the first cross-sectional area may have a curvature. The first cross-sectional area may have other shapes and/or sizes to enhance capturing high velocity and volume inlet airflow 214a.

The air duct 218 has an outlet portion 218c having a second cross-sectional area positioned proximal to a portion of the braking system 216 for directing the outlet airflow 214b to at least a portion of the braking system 216. As shown in FIG. 2, the outlet airflow 214b is directed to the brake caliper 216a and/or the rotor 216b. In addition, the outlet airflow 214b may be directed to other braking system parts that would benefit from cooling such as brake pads.

The air duct 218 has a body portion 218b positioned between the inlet portion 218a and the outlet portion 218c. One or more wind turbines 206 having blades configured to be rotated by the inlet airflow 214a are positioned at a third cross-sectional area 218d of the body portion 218b. The motor or the generator 104 is coupled with the wind turbines 206 for converting kinetic energy from the rotation of the wind turbine blades to electrical energy stored in the first battery 110 and/or the second battery 112. The motor or the generator 104 may be positioned proximal to the one or more wind turbines 206 or positioned remotely at another part of the vehicle 200.

The third cross-sectional area 218d is smaller than the first cross-sectional area of the inlet portion 218a and larger than the second cross-sectional area of the outlet portion 218c. Such configuration advantageously increases an exit velocity of the outlet airflow 214b to enhance cooling of the braking system 216 and increase energy generation, for the reasons described below with respect to FIG. 5.

Figures 3A, 3B:
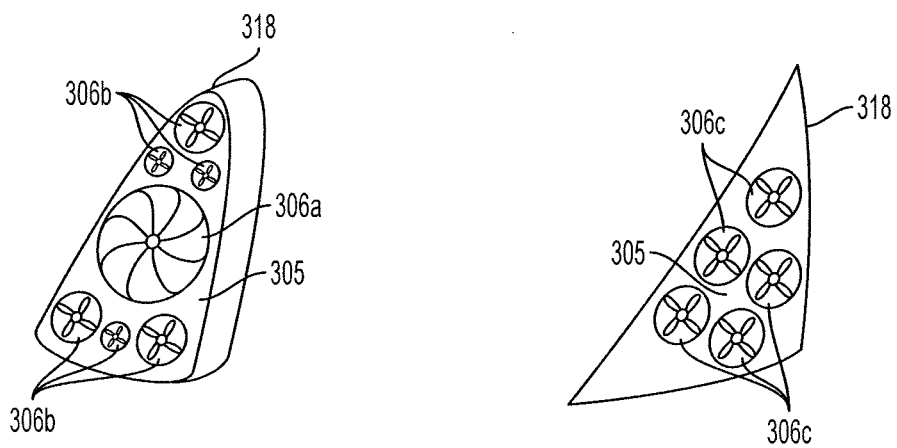
FIG. 3A is a schematic view of wind turbines having a relatively large central wind turbine positioned in an air duct, according to an aspect of the present invention.
FIG. 3B is a schematic view of wind turbines positioned in an air duct, according to an aspect of the present invention.

FIG. 3A shows an example of an arrangement of wind turbines 306a,b in an air duct 318 according to an aspect of the present invention. This arrangement can be incorporated in the vehicle 200 shown in FIG. 2 for cooling the braking system 216 and generating electrical energy. Because the bulk of the volume of the inlet airflow through the air duct 318 passes through the central portion, it is preferable to utilize a relatively large central or substantially central wind turbine 306a. This configuration minimizes airflow disturbance in the central portion because no mounting materials 305, which would otherwise block airflow, are utilized in the central region having the highest bulk of airflow volume. The mounting materials 305 are structural parts that mount or hold the wind turbines 306a,b in place. Preferably, four or more peripheral wind turbines 306b can be utilized around the central or substantially central wind turbine 306a to utilize the airflow in the available corner space of the air duct 318. Alternatively, less than or greater than four peripheral wind turbines 306b can be used around the central or substantially central wind turbine 306a. Accordingly, an advantage of this configuration is that it enhances the energy generation of the plurality of wind turbines 306 while enhancing cooling of the braking system 216.

The peripheral wind turbines 306b can be designed or controlled to be angled towards the center, as discussed in further details below with respect to FIG. 8. The peripheral wind turbines 306b can enhance cooling of the braking system 216 by re-directing peripheral airflows towards a portion of the braking system 216 that would benefit from cooling. An advantage of the system of the present invention is that orientation/positioning of the wind turbines 306 can be customized based on the positioning of the vehicle part desired to be cooled. This leads to faster and more effective cooling of the vehicle part desired to be cooled (e.g., the braking system 216).

As set forth above with respect to FIG. 1, it may be desirable at times to enhance cooling of the braking system 216 by activating or increasing rotation of wind turbines (306a, 306b and/or 306c). In an embodiment, the motor or the generator 104 includes an M-G configured to propel rotation of the wind turbines 306 to enhance cooling. Alternatively, a separate motor can be dedicated to propelling rotation of one or more wind turbines 306 as needed.

Referring to FIGS. 2, 3A and 3B, the determination of activating/de-activating rotation of the wind turbines 206/306a,b,c and the amount of energy allocated for propelling rotation of the wind turbines 206/306a,b,c may be based on the temperature of the braking system 216, the current or predicted vehicle speed, and/or various other parameters detected by the sensors. For example, the vehicle 200 may include one or more sensors for detecting or determining the vehicle speed. The vehicle 200 may also include one or more temperature sensors for detecting the temperature of the braking system 216. When the vehicle speed is less than a threshold, and the temperature of the braking system 216 is greater than a threshold, the ECU 102 may power rotation of the wind turbines 206/306a,b. As a result, the braking system 216 can be effectively cooled when the inlet airflow is insufficient at low vehicle speeds.

FIG. 3B shows an arrangement of wind turbines 306c that are separated by mounting materials 305. In this embodiment, the wind turbines do not include a large centrally positioned wind turbine. The number of wind turbines 306c, and their respective size and shape of the turbines and mounting materials 305 can be determined based on the expected amount of airflow in the corresponding cross-section of the turbines, amount of airflow disruption by the mounting materials 305, cost effectiveness of implementation and/or other parameters.

Figure 4A:
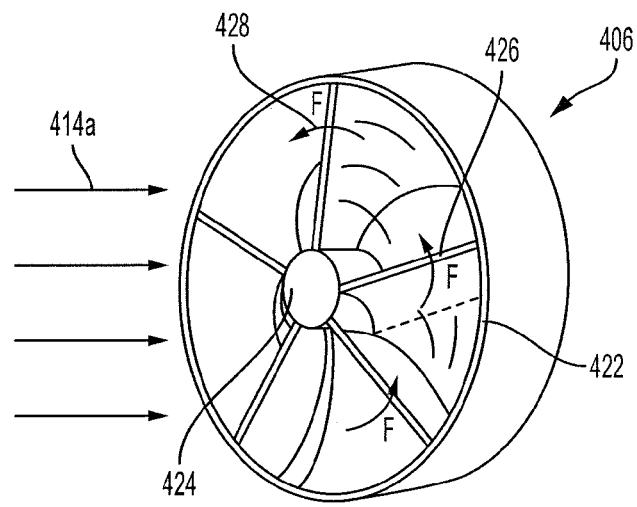
FIG. 4A is a schematic isometric view of blades of a wind turbine in a vehicle, according to an aspect of the present invention.
Figure 4B:
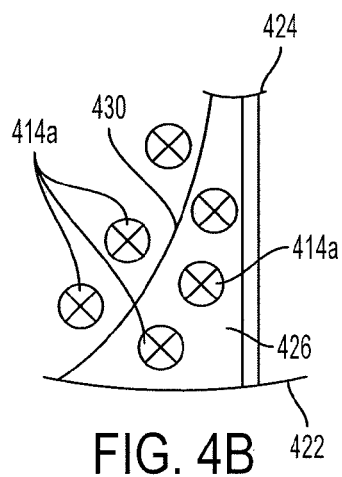
FIG. 4B is a schematic top view of a blade of a wind turbine, according to an aspect of the present invention.
Figure 4C:
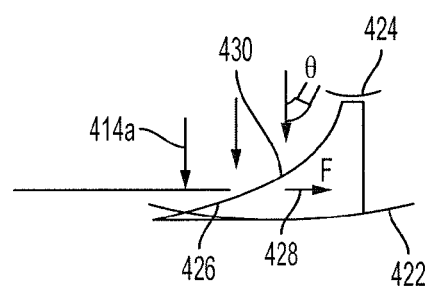
FIG. 4C is a schematic side view of a blade of a wind turbine, according to an aspect of the present invention.

FIGS. 4A-4C show an exemplary structure of blades when the inlet airflow 414a is expected to be substantially perpendicular to the first cross-sectional area of the wind turbine 406. FIGS. 4A, 4B and 4C show a schematic isometric view, top view and a side view, respectively, of the blades 426. The blades 426 are each connected to the central hub 424 and the turbine outer rim 422. If the inlet airflow 414a is parallel to the blades 426, the inlet airflow 414a may not rotate the blades 426 sufficiently to generate adequate electrical energy. However, disruption of the inlet airflow 414a is minimized, thereby reducing the impediment for cooling. As such, the curvature of the blades 426 and the angle theta (θ) that the blades 426 make with the inlet airflow 414a can be optimized based on the amount of energy generation desired, the amount of airflow disruption that can be tolerated without severely affecting cooling and/or other parameters. The angle theta (θ) is optimally between 0 and 65 degrees in order to advantageously enhance the reactionary rotational force without overly restricting cooling of vehicle parts. The blades 426 can be structured to make a different angle with the inlet airflow based on design concerns, without limiting the scope of the present invention. As shown in FIG. 4C, as the inlet airflow 414a exerts a force on the curved face 430 of the blade, it will create a reactionary rotational force ("F" or 428) that causes rotation of the blades 426. In general, the greater the reactionary rotational force ("F" or 428), the greater the electrical energy stored in the batteries 110 and/or 112. Therefore, the blades 426 can be designed to strike a proper balance between the foregoing two parameters (reducing disruption of airflow and increasing rotational force).

Figure 5:
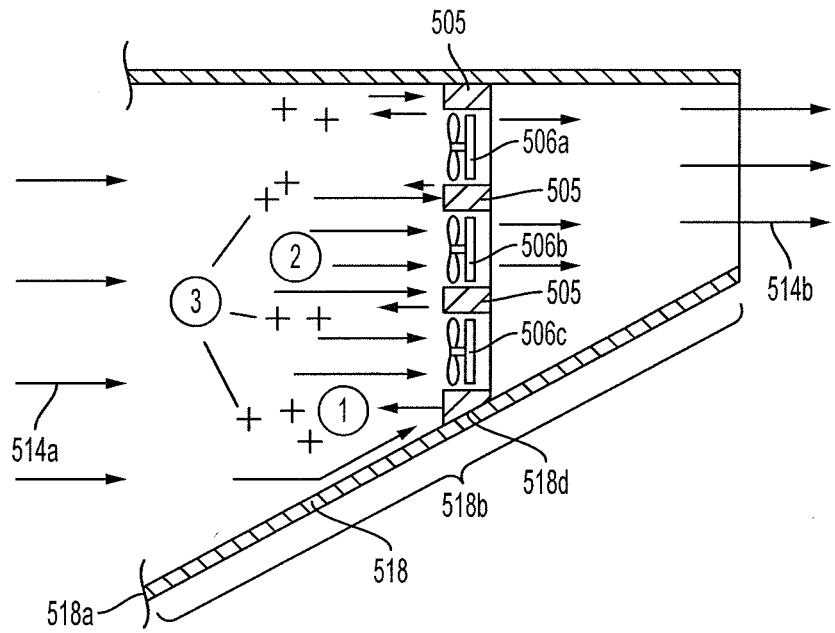
FIG. 5 is a schematic side view of wind turbines positioned in an air duct for increasing the exit velocity of an outlet airflow, according to an aspect of the present invention.

FIG. 5 is a side view of an air duct 518 designed for increasing the exit velocity (V2) of the outlet airflow 514b for enhancing cooling of a vehicle part desired to be cooled (e.g., the braking system 216). The wind turbines 506a-c are secured using mounting materials 505. Some of the inlet airflow 514a (denoted by encircled (1) in FIG. 5) will not pass directly through the wind turbines 506a-c. Some of the inlet airflow 514a (denoted by encircled (2) in FIG. 5) will pass directly through the wind turbines 506a-c. Pockets of high pressure air (denoted by encircled (3)) will develop as rebounding air meets additional inlet airflow 514a. Higher pressure airflow will eventually pass through the wind turbines 306a-c at a higher velocity than when it entered the air duct 518, per Bernoulli's principle. The square of the exit velocity (V2) of the outlet airflow 514b is increased over the square of the initial velocity (V1) of the inlet airflow 514a by the term $$\frac{2(P1-P2)}{\rho}$$

where ρ is density of fluid (air), and P1 and P2 are air pressures of the inlet airflow 514a and the outlet airflow 514b, respectively. As such, the exit velocity (V2) can be determined as follows:

$$V2 = \sqrt{\frac{2(P1-P2)}{\rho} + V1^2}.$$

Figure 6:
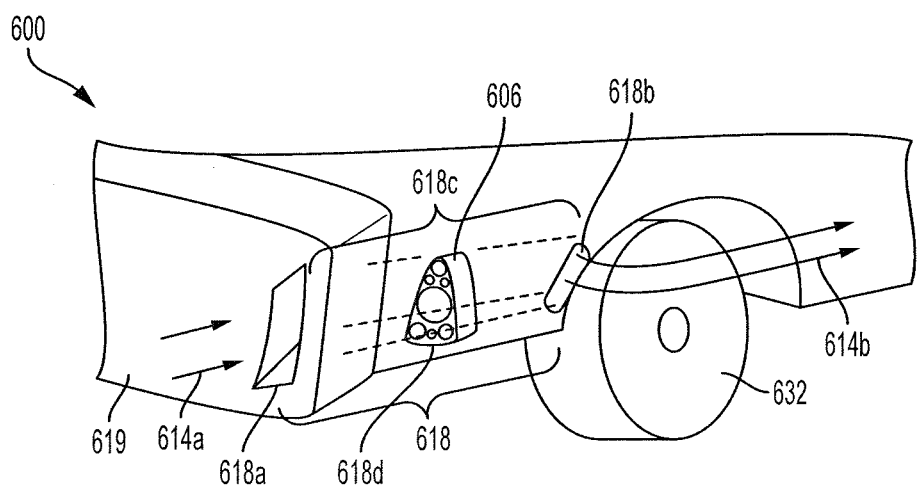
FIG. 6 is a schematic perspective view of a vehicle having wind turbines positioned in an air duct for enhancing aerodynamics and generating electrical energy, according to an aspect of the present invention.

FIG. 6 shows a vehicle 600 incorporating an air duct 618 that enhances aerodynamics of the vehicle 600. The air duct 618 has an inlet portion 618a with an opening positioned at a front bumper 619. The opening has a first cross-sectional area. The outlet portion 618b has a second cross-sectional area smaller than the first cross-sectional area. The outlet portion 618b is positioned proximal to at least one of the wheels 632 for enhancing vehicle aerodynamics.

Wheel and tire rotation are one of the significant drag components for vehicles. Proper wheel spoke design can reduce the drag components, but does not eliminate them. The air duct 618 improves aerodynamics of the vehicle 600 by pulling in air from the front bumper 619 and funneling the outlet airflow 614b around the front wheel 632. Therefore, the air duct 618 is advantageously designed to form an air curtain for significantly reducing unwanted drag. The same or a similar process can be performed on the opposing side of the front bumper 619 and the vehicle 600 (not shown) to reduce aerodynamics in a balanced manner.

The wind turbines 606 that generate electrical energy are positioned in the air duct 618. The wind turbines 606 have blades configured to be rotated by the inlet airflow 614a. The wind turbines 606 are positioned at a third cross-sectional area 618d of the body portion 618c. The third cross-sectional area 618d is smaller than the first cross-sectional area at the inlet portion 618a and larger than the second cross-sectional area at the outlet portion 618b, for increasing a velocity of an airflow passing through the wind turbines 606.

Because cooling is not performed, the wind turbines 606 can be further optimized for electrical generation. In other words, disruption of airflow for cooling is not as much of a design concern in this configuration as it was in the air ducts utilized for cooling (see e.g., air duct 218 for cooling the braking system 216 in FIG. 2). As such, the wind turbines 606 designed for this application can introduce a greater amount of air resistance, which can be used to increase the rotational force. The greater rotational force leads to greater generation of electrical energy using the motor or the generator 104.

The wind turbines 606 may have the structure and configurations similar to those described above with respect to FIG. 3A or 3B. For example, the wind turbines 606 may include a relatively larger centrally positioned wind turbine with peripheral wind turbines around the centrally positioned wind turbine.

Figure 7A:
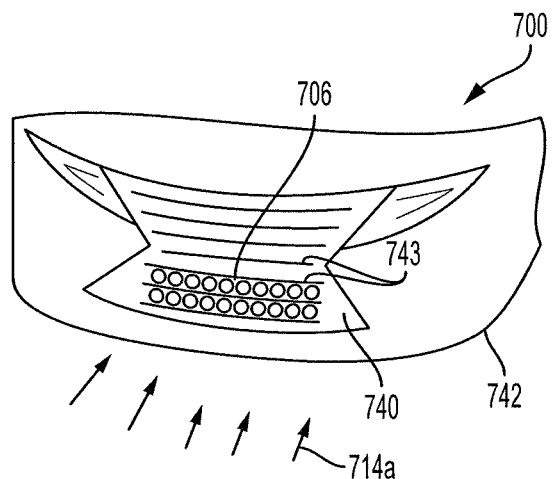
FIG. 7A is a front view of a vehicle having a cooling and energy generation system that utilizes an inlet airflow passed through openings of a front grill, according to an aspect of the present invention.
Figure 7B:
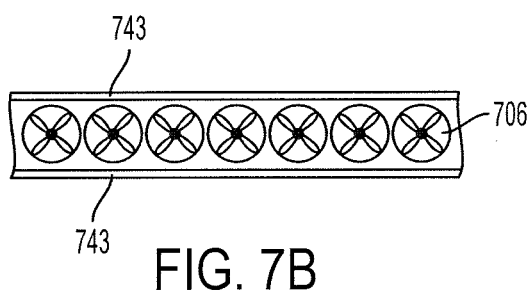
FIG. 7B is a close-up view of FIG. 7A, showing wind turbines positioned between grill slats, according to an aspect of the present invention.

FIG. 7A is a front view of a vehicle 700 having a cooling and energy generation system positioned proximate to a front grill 740. FIG. 7B is a schematic close-up view of FIG. 7A, showing wind turbines 706 positioned as an array between grill slats 743. Referring to FIGS. 7A and 7B, the inlet airflow 714a is used for cooling a radiator and generating electrical energy for storage in the first battery 110 and/or the second battery 112.

Figure 8:
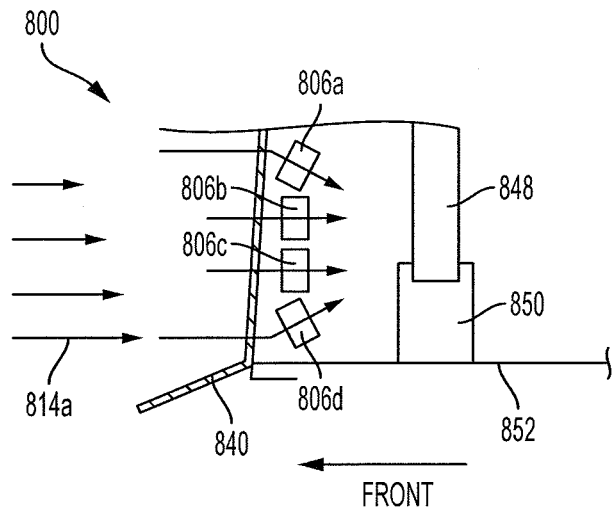
FIG. 8 is a schematic side view of a wind turbine system for generating electrical energy and enhancing cooling of a radiator via redirection of inlet airflow, according to an aspect of the present invention.

FIG. 8 is a side view of a vehicle 800 having wind turbines (806a-d) for enhancing cooling of a radiator 848 and generating electrical energy. The radiator 848 is secured using a mount 850 coupled to the underbody panel 852. The opening of the grill 840 is typically greater than the front cross-sectional area of the radiator 848 in part because of the positioning of the mount 850. In addition to the mount 850, there may be other body hardware, devices, and units that would not necessarily benefit from cooling. As such, without redirection of airflow, some of the available inlet airflow 814a would not be efficiently utilized for cooling the radiator 848. However, the invention advantageously enhances cooling of the radiator 848 by positioning and orienting the wind turbines 806 such that the inlet airflow 814a is re-directed towards the radiator 848. For example, the peripheral wind turbines 806a and 806d can be angled towards the radiator 848.

In the side view shown in FIG. 8, top and bottom peripheral turbines 806a and 806d are angled towards the radiator 848. Similarly, when viewing the system from the top, there may be more than one horizontally positioned wind turbine. The wind turbines in this configuration can be similarly angled towards the radiator 848 to focus the airflow towards the radiator 848.

Figure 9A:
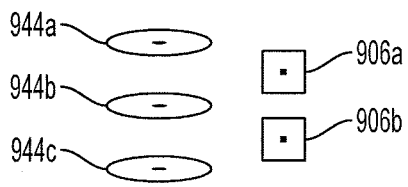
FIG. 9A is a schematic side view of wind turbines positioned proximal to openings between grill shutters for cooling a radiator and generating electrical energy, according to an aspect of the present invention.
Figure 9B:
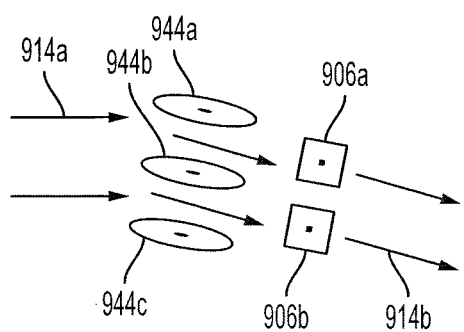
FIG. 9B is a schematic side view of the wind turbines and grill shutters in FIG. 9A, rotated/tilted in conjunction with one another, according to an aspect of the present invention.

FIGS. 9A and 9B show wind turbines (906a,b) and grill shutters 944a-c that are positioned or orientated in conjunction with one another, for example, by rotation or tilting around their respective centrally positioned axes. FIG. 9A shows the grill shutters 944a-c and the wind turbines 906a,b in a first orientation, and FIG. 9B shows them in a second orientation after rotation/tilting around their respective centrally positioned axes.

Controlling the opening/closing and in general adjusting the angle of shutters 944a-c can enhance aerodynamics by reducing unwanted drag. Introducing air through open grill shutters 944a-c can introduce unwanted drag, for example, at high vehicle speeds. If the engine is in a cool state, it would be desirable to close the shutters 944a-c or at least control the angle to reduce the airflow and the drag. In hybrid vehicles, the engine may indeed be in a cool state at high speeds particularly because all or a large portion of the vehicle energy can be supplied by the first battery 110 (e.g., when the vehicle operates in Electric Vehicle mode without utilizing the engine power). When the engine is in a cool state (e.g., as determined by an engine temperature detected by the sensors) and the vehicle speed is high (e.g., when the detected vehicle speed is greater than a threshold), the ECU 102 can substantially or entirely close the shutters 944a-c or adjust their angle accordingly to reduce the inlet airflow 914a to improve aerodynamics.

The ECU 102 may be connected to at least one positioning motor of the motor or generator 104 for rotating or tilting the shutters 944a-c and/or the wind turbines 906a,b. The term "positioning" is used herein to distinguish (a) the at least supplementary motor used for positioning or orienting shutters and/or wind turbines, for example, about their respective axes from (b) motors, generators, or M-Gs described above that are related to rotation of the blades of the wind turbines. In an embodiment, the shutters 944a-c may be mechanically connected to one another such that all or most of them would rotate or tilt in conjunction with one another using power output of a single positioning motor. In such an embodiment, the shutters 944a-c can be further mechanically coupled to the wind turbines 906a,b such that they all rotate/tilt in conjunction with one another as shown in FIGS. 9A and 9B. This allows the turbines 906a,b to be aligned such that they can harness the energy of the inlet airflow 914a.

Alternatively, first one or more positioning motors can be utilized for controlling tilting or rotation of the shutters 944a-c, and second one or more positioning motors can be utilized for controlling tilting or rotation of the wind turbines 906a,b. The ECU 102 knows the rotation or tilting angle of the shutters 944a-c since it controls their respective rotation/tilting or can alternatively determine the rotation/tilting via a positioning/orientation sensor. The ECU 102 can separately control rotation or tilting of the wind turbines 906 based on the orientation of the shutters 944a-c and/or other parameters such as vehicle speed, engine/radiator temperature, etc.

The rotation/tilting may match the rotation/tilting of the shutters 944a-c. Alternatively, the rotation/tilting of wind turbines 906a,b can be different from that of the shutters 944a-c if the difference enhances electrical energy generation and/or cooling. For example, the ECU 102 may determine that the generated rotational force of the wind turbines 906a,b can be increased when the wind turbines 906a,b are rotated with an angle that may be different from an angle of rotation of the shutters 944a-c. As discussed above with respect to FIGS. 4A-4C, the tilting/rotation can be controlled such that the angle theta ($\theta$) is optimum for increasing rotation of the wind turbines 906a,b for generating electrical energy.

Figure 10:
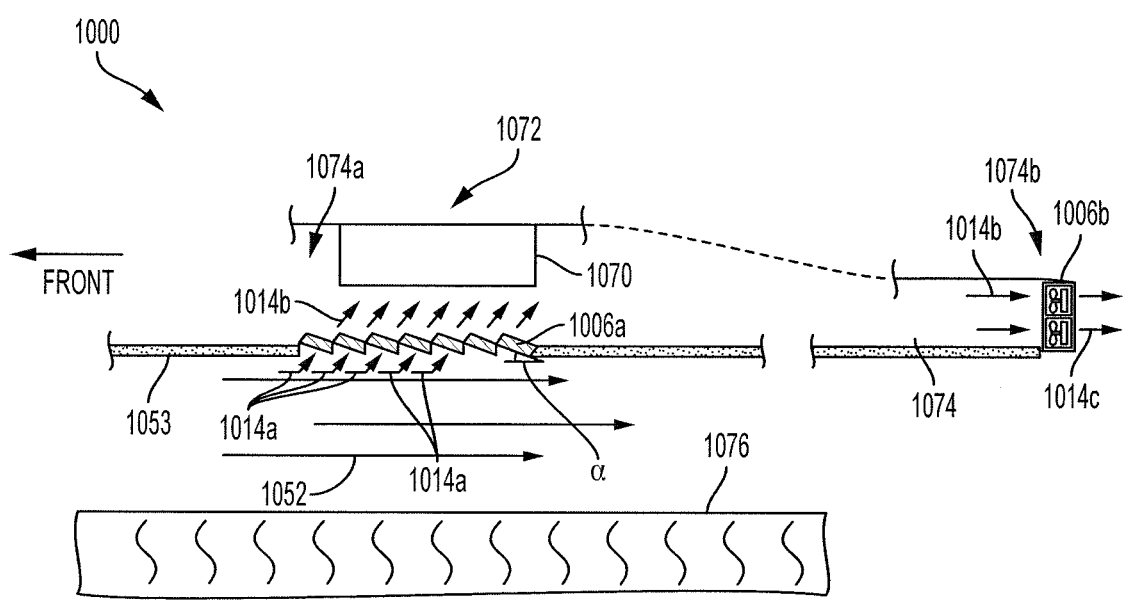
FIG. 10 is a schematic side view of a vehicle having wind turbines positioned proximal to an opening of the vehicle's underbody panel, according to an aspect of the present invention.

FIG. 10 shows a vehicle 1000 having wind turbines 1006a positioned in an opening of the vehicle's underbody panel 1053. The underbody panel 1053 forms a lower surface of the vehicle 1000 and has an opening. An oil reservoir 1070 (e.g., an "oil pan") is positioned above and proximal to the opening. The oil reservoir 1070 contains oil used by the vehicle's engine. One or more drivetrain or powertrain devices 1072 are positioned above the underbody panel 1053. The one or more drivetrain or powertrain devices 1072 may include an engine block, a transmission housing, a differential gear housing, and/or various other drivetrain or powertrain devices that have a part that would benefit from cooling. An air channel 1074 is positioned between the underbody panel 1053, the one or more drivetrain or powertrain devices 1072 and the oil reservoir 1070.

An airflow 1052 flows from the front to the rear of the vehicle 1000 between the road/ground surface 1076 and the underbody panel 1053. The first plurality of wind turbines 1006a are angled to efficiently capture an inlet airflow 1014a which is a portion of the airflow 1052. The angle alpha ($\alpha$) between the horizontal surface and the face of the wind turbines 1006a is optimized to increase the portion of airflow 1052 captured for cooling and energy generation, and increase the rotational force, as described above with respect to FIGS. 4A-C.

The captured portion of the airflow 1052 passes as the inlet airflow 1014a through the first wind turbines 1006a. The outlet airflow 1014b cools the oil reservoir 1070 and/or drivetrain or powertrain devices 1072. The outlet airflow 1014b passes from the front portion 1074a to the rear portion 1074b of the air channel 1074. Second wind turbines 1006b are positioned in or adjacent to the opening of the rear end portion 1074b of the air channel 1074. The airflow exits as vehicle outlet airflow 1014c from the rear portion of the vehicle 1000.

As such, electrical energy can be generated using the second wind turbines 1006b in addition to the electrical energy generated using the first wind turbines 1006a. Therefore, the invention generates a significant amount of electrical energy while effectively cooling vehicle parts exposed to the airflow in the channel 1074.

The system of the present invention was described above with respect to different parts of the vehicle. A vehicle according to the present invention may have one or more of the above-described systems in conjunction with another.

For example, the system of FIG. 2 proximal to the braking system can be incorporated in addition to the system proximal to the radiator in FIG. 8 and/or the air channel system proximal to the drivetrain or powertrain devices in FIG. 10.

While only certain embodiments of the invention have been described in detail, a person skilled in the art would appreciate that certain changes and modifications may be made in the embodiments without departing from the spirit and scope of the invention. A person skilled in the art would appreciate the invention may be practiced other than as specifically described with respect to the foregoing embodiments of the method/system.

The invention claimed is:

1. A fully electric or partially electric vehicle having a battery for storing electrical energy, the vehicle comprising:
    wheels;
    a braking system having a rotor and a brake pad for decelerating rotation of at least one of the wheels;
    an air duct having:
        an inlet portion forming an opening for receiving an inlet airflow,
        an outlet portion positioned proximal to at least a portion of the braking system and forming an opening for directing an outlet airflow to the braking system, and
        a body portion positioned between the inlet portion and the outlet portion;
    at least one wind turbine having blades configured to be rotated by the inlet airflow, the at least one wind turbine positioned at a location in the body portion; and
    a motor or a generator coupled with the at least one wind turbine for converting kinetic energy from the rotation of the blades of the at least one wind turbine to electrical energy stored in the battery.

2. The vehicle of claim 1, wherein the at least one wind turbine includes a plurality of wind turbines and a plurality of mounting materials positioned between the plurality of wind turbines, the plurality of mounting materials positioned such that an exit velocity of the outlet airflow is enhanced for cooling the braking system.

3. The vehicle of claim 2, wherein the plurality of wind turbines include a substantially centrally positioned wind turbine and at least four peripheral wind turbines positioned around the substantially centrally positioned wind turbine for enhancing an overall energy generation of the plurality of wind turbines and decreasing disruption of the inlet airflow.

4. The vehicle of claim 2, wherein the plurality of wind turbines include a first peripheral wind turbine, a second peripheral wind turbine, and at least one middle wind turbine positioned between the first peripheral wind turbine and the second peripheral wind turbine, and wherein the first peripheral wind turbine and the second peripheral wind turbine are angled towards the at least one middle wind turbine for enhancing the cooling of the braking system by directing peripheral airflows towards a middle portion of the braking system.

5. The vehicle of claim 1, further comprising:
    an electronic control unit coupled with the motor or generator and configured to power rotation of the blades of the at least one wind turbine using the motor or the generator to cool the braking system based on at least one of a speed of the vehicle or a temperature of the braking system.

6. The vehicle of claim 1, wherein the blades have a curvature that forms an angle with a direction of the inlet airflow to enhance a rotational force of the blades for increasing the electrical energy stored in the battery.

7. The vehicle of claim 1, wherein the braking system includes a brake caliper positioned proximal to the outlet portion of the air duct for receiving the outlet airflow.

8. The vehicle of claim 1, wherein the opening of the inlet portion has a first cross-sectional area, the opening of the outlet portion has a second cross-sectional area, and the location of the at least one wind turbine in the body portion has a third cross-sectional area, the first cross-sectional area being larger than the third cross-sectional area, and the third cross-sectional area being larger than the second cross-sectional area, for increasing an exit velocity of the outlet airflow to enhance cooling of the braking system.

9. A system for generating and storing electrical energy by a fully electric or partially electric vehicle having a battery and wheels, the system comprising:
    a braking unit for decelerating rotation of at least one of the wheels;
    an air duct having:
        an inlet portion forming an opening for receiving an inlet airflow,
        an outlet portion positioned proximal to at least a portion of the braking unit and forming an opening for directing an outlet airflow to the braking unit, and
        a body portion positioned between the inlet portion and the outlet portion;
    at least one wind turbine having blades configured to be rotated by the inlet airflow, the at least one wind turbine positioned at a location in the body portion; and
    a motor or a generator coupled with the at least one wind turbine for converting kinetic energy from the rotation of the blades of the at least one wind turbine to electrical energy stored in the battery.

10. The system of claim 9, wherein the at least one wind turbine includes a plurality of wind turbines and a plurality of mounting materials positioned between the plurality of wind turbines, the plurality of mounting materials positioned such that an exit velocity of the outlet airflow is enhanced for cooling the braking unit.

11. The system of claim 10, wherein the plurality of wind turbines include a substantially centrally positioned wind turbine and at least four peripheral wind turbines positioned around the substantially centrally positioned wind turbine for enhancing an overall energy generation of the plurality of wind turbines and decreasing disruption of the inlet airflow.

12. The system of claim 10, wherein the plurality of wind turbines include a first peripheral wind turbine, a second peripheral wind turbine, and at least one middle wind turbine positioned between the first peripheral wind turbine and the second peripheral wind turbine, and wherein the first peripheral wind turbine and the second peripheral wind turbine are angled towards the at least one middle wind turbine for enhancing the cooling of the braking unit by directing peripheral airflows towards a middle portion of the braking unit.

13. The system of claim 9, further comprising:
    an electronic control unit coupled with the motor or generator and configured to power rotation of the blades of the at least one wind turbine using the motor or the generator to cool the braking unit based on at least one of a speed of the vehicle or a temperature of the braking unit.

14. The system of claim 9, wherein the blades have a curvature that forms an angle with a direction of the inlet airflow to enhance a rotational force of the blades for increasing the electrical energy stored in the battery.

15. The system of claim 9, wherein the braking system includes a brake caliper positioned proximal to the outlet portion of the air duct for receiving the outlet airflow.

16. A fully electric or partially electric vehicle having a battery for storing electrical energy, the vehicle comprising:
   a braking unit for decelerating the vehicle;
   an air duct having:
      an inlet portion forming an opening for receiving an inlet airflow,
      an outlet portion positioned proximal to at least a portion of the braking unit and forming an opening for directing an outlet airflow to the braking unit for cooling the braking unit, and
      a body portion positioned between the inlet portion and the outlet portion;
   at least one wind turbine having blades configured to be rotated by the inlet airflow, the at least one wind turbine positioned at a location in the body portion; and
   a motor or a generator coupled with the at least one wind turbine for converting kinetic energy from the rotation of the blades of the at least one wind turbine to electrical energy stored in the battery.

17. The vehicle of claim 16, wherein the opening of the inlet portion has a first cross-sectional area, the opening of the outlet portion has a second cross-sectional area, and the location of the at least one wind turbine in the body portion has a third cross-sectional area, the first cross-sectional area being larger than the third cross-sectional area, and the third cross-sectional area being larger than the second cross-sectional area, for increasing an exit velocity of the outlet airflow to enhance the cooling of the braking unit.

18. The vehicle of claim 16, wherein the at least one wind turbine includes a plurality of wind turbines and a plurality of mounting materials positioned between the plurality of wind turbines, the plurality of mounting materials positioned such that an exit velocity of the outlet airflow is enhanced for cooling the braking unit.

19. The vehicle of claim 18, wherein the plurality of wind turbines include a substantially centrally positioned wind turbine and at least four peripheral wind turbines positioned around the substantially centrally positioned wind turbine for enhancing an overall energy generation of the plurality of wind turbines and decreasing disruption of the inlet airflow.

20. The vehicle of claim 18, wherein the plurality of wind turbines include a first peripheral wind turbine, a second peripheral wind turbine, and at least one middle wind turbine positioned between the first peripheral wind turbine and the second peripheral wind turbine, and wherein the first peripheral wind turbine and the second peripheral wind turbine are angled towards the at least one middle wind turbine for enhancing the cooling of the braking unit by directing peripheral airflows towards a middle portion of the braking unit.

21. The vehicle of claim 16, further comprising:
   an electronic control unit coupled with the motor or generator and configured to power rotation of the blades of the at least one wind turbine using the motor or the generator to cool the braking unit based on at least one of a speed of the vehicle or a temperature of the braking unit.

22. The vehicle of claim 16, wherein the blades have a curvature that forms an angle with a direction of the inlet airflow to enhance a rotational force of the blades for increasing the electrical energy stored in the battery.

* * * * *